(12) United States Patent
Horikawa

(10) Patent No.: US 7,976,170 B2
(45) Date of Patent: Jul. 12, 2011

(54) HOLOGRAPHIC PROJECTION METHOD AND HOLOGRAPHIC PROJECTION DEVICE

(75) Inventor: Yoshiaki Horikawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/341,770

(22) Filed: Dec. 22, 2008

(65) Prior Publication Data
US 2009/0109405 A1    Apr. 30, 2009

Related U.S. Application Data

(63) Continuation of application No. PCT/JP2008/053283, filed on Feb. 26, 2008.

(30) Foreign Application Priority Data

Mar. 2, 2007 (JP) ................................. 2007-053110

(51) Int. Cl.
*G03B 21/14* (2006.01)
*H04N 5/74* (2006.01)

(52) U.S. Cl. .................. 353/31; 359/11; 359/22; 359/29

(58) Field of Classification Search .................... 353/31, 353/84, 122, 121; 359/10, 11, 22, 29, 25; 165/104.26, 104.29
See application file for complete search history.

(56) References Cited

U.S. PATENT DOCUMENTS

| | | | |
|---|---|---|---|
| 5,132,839 A | | 7/1992 | Travis |
| 5,589,955 A | | 12/1996 | Amako et al. |
| 5,627,678 A | * | 5/1997 | Nishii et al. ................. 359/561 |
| 5,798,864 A | * | 8/1998 | Sekiguchi ..................... 359/559 |
| 6,011,874 A | | 1/2000 | Gluckstad |
| 6,346,695 B2 | | 2/2002 | Yanagawa et al. |
| 6,844,947 B2 | * | 1/2005 | Salehi et al. .................... 359/15 |
| 7,218,435 B2 | * | 5/2007 | Slinger ........................ 359/245 |
| 7,470,028 B2 | * | 12/2008 | Miller ............................ 353/31 |
| 2002/0149584 A1 | * | 10/2002 | Simpson et al. .............. 345/423 |
| 2003/0010763 A1 | | 1/2003 | Fukuchi et al. |
| 2007/0024999 A1 | * | 2/2007 | Crossland et al. ............ 359/859 |
| 2007/0113012 A1 | | 5/2007 | Cable et al. |

(Continued)

FOREIGN PATENT DOCUMENTS

JP    7-261125 A    10/1995

(Continued)

OTHER PUBLICATIONS

Related U.S. Appl. No. 12/341,623, filed Dec. 22, 2008; Inventor: Yoshiaki Horikawa; Title: Holographic Projection Method and Holographic Projection Device.

(Continued)

*Primary Examiner* — William C Dowling
(74) *Attorney, Agent, or Firm* — Holtz, Holtz, Goodman & Chick, PC

(57) ABSTRACT

According to the present invention, a plurality of video image data are converted into individual spatial frequency information using Fourier transformation. The individual spatial frequency information is provided to a plurality of information display unit corresponding to the individual spatial frequency information. The spatial frequency information corresponding to the plurality of video image data is displayed on the plurality of information display unit, light is irradiated onto the plurality of information display unit using a plurality of light sources corresponding to the plurality of information display unit. The spatial frequency information that is displayed by the plurality of information display unit is projected by using diffraction light, and a plurality of video images are synthesized on projection surfaces.

29 Claims, 5 Drawing Sheets

U.S. PATENT DOCUMENTS

| | | | |
|---|---|---|---|
| 2008/0212034 A1* | 9/2008 | Aksyuk et al. | 353/20 |
| 2008/0212040 A1* | 9/2008 | Aksyuk | 353/99 |
| 2009/0103151 A1* | 4/2009 | Horikawa | 359/9 |

FOREIGN PATENT DOCUMENTS

| | | |
|---|---|---|
| JP | 11-504129 A | 4/1999 |
| JP | 2001-272636 A | 10/2001 |
| JP | 2002-207202 A | 7/2002 |
| WO | WO 2005/059881 A3 | 6/2005 |
| WO | WO 2006/134404 A1 | 12/2006 |

OTHER PUBLICATIONS

English Language International Search Report dated May 20, 2007 issued in parent Appln. No. PCT/JP2008/053283.

International Preliminary Report on Patentability and Written Opinion (in English) dated Sep. 17, 2009 issued in a counterpart International Application No. PCT/JP2008/053283.

"Floating Point," http://en.wikipedia.org/wki/Floating-point, Dec. 15, 2010.

* cited by examiner

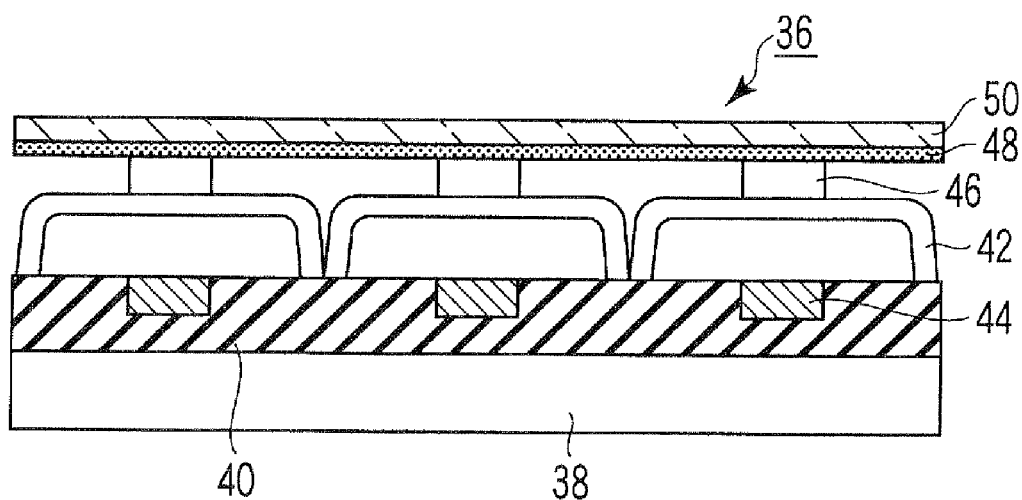
F I G. 6A
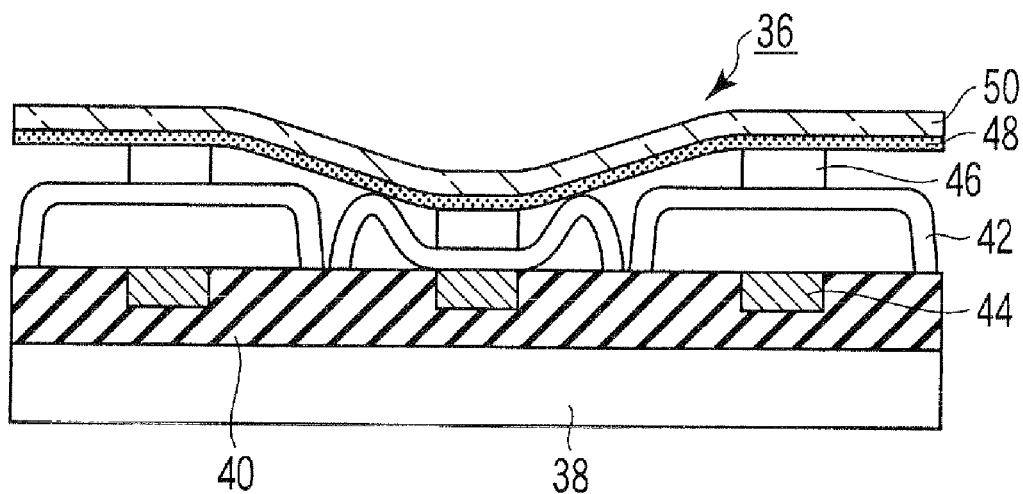
F I G. 6B

HOLOGRAPHIC PROJECTION METHOD AND HOLOGRAPHIC PROJECTION DEVICE

CROSS-REFERENCE TO RELATED APPLICATIONS

This is a Continuation Application of PCT Application No. PCT/JP2008/053283, filed Feb. 26, 2008, which was published under PCT Article 21(2) in Japanese.

This application is based upon and claims the benefit of priority from prior Japanese Patent Application No. 2007-053110, filed Mar. 2, 2007, the entire contents of which are incorporated herein by reference.

BACKGROUND OF THE INVENTION

1. Field of the Invention

The present invention relates to a holographic projection method and a holographic projection device.

2. Description of the Related Art

In general, examples of a projection device that projects a video image onto a screen include a projection device using transmission-type liquid crystal (LC), a projection device using reflecting liquid crystal (liquid crystal on silicon [LCOS]), and a projection device using a digital micromirror device (DMD).

For example, in the projection device using liquid crystal, a video image is projected onto a screen as follows. That is, first, a video image that a user desires to project is displayed on liquid crystal in accordance with video image data. Then, the liquid crystal is illuminated by illumination light and transmission light or reflection light is projected by a projection lens, and the video image displayed on the liquid crystal is displayed on a screen to be enlarged.

In the projection device using a DMD, a video image is displayed on the DMD by turning on/off the micromirrors which constitutes the DMD and correspond to pixels in accordance with video image data and then the video image data is projected onto a screen by a projection lens.

The above-described projection devices adopt a method in which a video image is displayed on an image display element, e.g; liquid crystal, at a time and the displayed video image is projected to be enlarged by the projection lens. Accordingly, the above-described projection devices each include a light source, an illumination optical system, an image display element, and a projection lens.

In addition, in a color sequencing expression, a color filter that changes a color of a light source is further required. In a method using a plurality of image display elements for each color, a color separation/synthesis optical system that is provided around the image display elements is further required.

In general, an incoherent light source, such as a high pressure mercury lamp, is used as a light source. Therefore, a complicated illumination optical system is needed to efficiently and uniformly illuminate light to the image display elements using the light source.

For a color conversion, a color filter needs to be provided and a color synthesis/separation optical system needs to be provided around the excessively complicated image display elements.

In view of such circumstances, a projection device using a spatial light phase modulator (SPM), which is shown in FIG. 7, is suggested. For example, this type of projection device is disclosed in detail in WO 2005/059881A3.

That is, in the projection device that is disclosed in WO 2005/059881A3, as shown in FIG. 7, linearly polarized light from a light source (laser) 100 is incident on a polarized beam splitter (PBS) 102, reflected on the PBS 102, and incident on an LCOS 104 that is the SPM. In addition, a λ/4 plate (not shown) is provided between the PBS 102 and the LCOS 104.

Diffraction light 105 is subjected to phase modulation by the LCOS 104 in accordance with video image data and then reflected. The diffraction light 105 passes through the λ/4 plate again, is transmitted through the PBS 102, and is projected onto a screen 108 through a projection lens 106. In this case, a binary modulation of a phase difference π is obtained according to whether or not the phase modulation is performed by the LCOS 104. Meanwhile, zero-order light 107 is not incident on the projection lens 106.

As such, for example, in WO 2005/059881A3, a small-sized projection device is disclosed, which uses a simple illumination optical system and includes a simple projection lens.

The method that is disclosed in WO 2005/059881A3 is a method that projects a video image using diffraction. In this case, the brightness of the projected video image is determined based on diffraction efficiency of a spatial light phase modulator. For example, in the case of the binary modulation of the phase difference π, diffraction efficiency is approximately 40%. In addition, if the amount of phase modulation is changed minutely, it is possible to improve diffraction efficiency. In addition, if the amount of phase modulation is continuously changed, the diffraction efficiency ideally reaches 100%.

In addition, the total amount of the diffracted light with respect to the light source accounts for a predetermined ratio. Meanwhile, a bright scene and a dark scene exist in the video image, and the total amount of light is changed. Accordingly, when the brightness of the light source is constant, for example, an originally dark scene of a video image may be displayed brightly. In view of such circumstances, the total amount of brightness of each scene needs to be calculated for each scene based on video image data, and the amount of light that is incident on the SPM needs to be adjusted such that the brightness of each scene is appropriately maintained with respect to a scene having the maximum brightness.

As a technology that may be used to solve the above-described problems, for example, U.S. Pat. No. 5,589,955 discloses the following technology. In the case that characters of dot patterns are drawn, since the number of dots is different for each character, an output of a laser that is a light source is increased or decreased to make brightness of each character the same by counting the number of the dots.

In addition, in order to perform color video image display, generally, a red image, a blue image, and a green image need to be synthesized. Accordingly, a complicated optical system is needed.

BRIEF SUMMARY OF THE INVENTION

In general, in order to obtain a color video image in a projection device, a complicated optical system is needed.

The present invention has been made to solve the above-described problems, and it is an object of the present invention to provide video image display using a holographic projection method and a holographic projection device in which a complicated optical system, such as a synthesis prism, is not needed by utilizing a characteristic using a spatial light phase modulator, thereby achieving a simplified structure.

According to a first aspect of the invention, there is provided a holographic projection method comprising:

a Fourier transformation step of converting a plurality of video image data into individual spatial frequency information using Fourier transformation;

an information provision step of providing the individual spatial frequency information to a plurality of information display means corresponding to the individual spatial frequency information;

a display step of displaying the spatial frequency information corresponding to said plurality of video image data on said plurality of information display means;

an irradiation step of irradiating light onto said plurality of information display means using a plurality of light sources corresponding to said plurality of information display means; and a projection step of projecting the spatial frequency information displayed by said plurality of information display means using diffraction light and synthesizing a plurality of video images onto projection surfaces. As a result, it is possible to realize a holographic projection method using a small device.

According to a second aspect of the invention, there is provided the holographic projection method according to the first aspect, wherein said plurality of light sources include a red light source, a green light source, and a blue light source, and said plurality of video image data include red video image data, green video image data, and blue video image data. As a result, it is possible to realize color display.

According to a third aspect of the invention, there is provided the holographic projection method according to the second aspect, wherein the information display means each are composed of a spatial light phase modulator. As a result, it is possible to provide a holographic projection method that has excellent light utilization efficiency.

According to a fourth aspect of the invention, there is provided the holographic projection method according to the third aspect, wherein said plurality of spatial light phase modulators are disposed on the same plane. As a result, it is possible to provide a method in which color display can be realized without using a color synthesis prism.

According to a fifth aspect of the invention, there is provided the holographic projection method according to the fourth aspect, wherein said plurality of spatial light phase modulators each are composed of a reflecting spatial light phase modulator. As a result, it is possible to provide a display method in which high diffraction efficiency can be realized and bright display is enabled.

According to a sixth aspect of the invention, there is provided the holographic projection method according to the fifth aspect, wherein said plurality of spatial light phase modulators each include a mirror. As a result, it is possible to provide a display method in which higher light utilization efficiency can be obtained and brighter display is enabled.

According to a seventh aspect of the invention, there is provided the holographic projection method according to the sixth aspect, further comprising:

a light amount adjustment step of adjusting the amount of light that is irradiated by the red light source, the green light source, and the blue light source based on the video image data. As a result, it is possible to provide display having excellent color balance.

According to an eighth aspect of the invention, there is provided the holographic projection method according to the seventh aspect, wherein the amount of light that is incident from the red light source, the green light source, and the blue light source is set to zero, while the spatial frequency information is altered in the information display means. As a result, unnecessary diffraction light can be removed and display having excellent contrast can be provided.

According to a ninth aspect of the invention, there is provided the holographic projection method according to the eighth aspect, wherein the adjustment of the light amount in the light amount adjustment step is performed by controlling the red light source, the green light source, and the blue light source. As a result, it is possible to provide display means that has excellent color balance and excellent contrast without individually including light amount control means.

According to a tenth aspect of the invention, there is provided the holographic projection method according to the first aspect, wherein, in the Fourier transformation step, the Fourier transformation is performed after random phases are added to the video image data. As a result, it is possible to use phase-modulation diffraction having excellent diffraction efficiency and to realize bright display.

According to an eleventh aspect of the invention, there is provided the holographic projection method according to the tenth aspect, wherein, in the Fourier transformation step, a correction process based on phase information depending on the optical system is executed on the spatial frequency information including spatial light phase information obtained by performing the Fourier transformation. As a result, it is possible to increase a degree of freedom of optical arrangement.

According to a twelfth aspect of the invention, there is provided the holographic projection method according to the eleventh aspect, wherein, in the Fourier transformation step, the correction process is executed based on a distance between the spatial light phase modulator and projection means. As a result, it is possible to provide projection means in which it is possible to cope with a change in projection distance and to freely change a projection distance without using a projection lens and focusing thereof.

According to a thirteenth aspect of the invention, there is provided a holographic projection device comprising:

a plurality of light sources to irradiate light;

data processing means for converting a plurality of video image data into individual spatial frequency information using Fourier transformation; and a plurality of information display means which are provided to correspond to said plurality of light sources and display the spatial frequency information, wherein said plurality of information display means are disposed such that diffraction light, which is irradiated by said plurality of light sources and modulated as the spatial phase information by said plurality of information display means, is synthesized as a projection video image on projection surfaces. As a result, it is possible to provide a holographic projection device that does not need a color synthesis prism.

According to a fourteenth aspect of the invention, there is provided the holographic projection device according to the thirteenth aspect, wherein the information display means each are composed of a spatial light phase modulator. As a result, it is possible to provide a projection device that has high light utilization efficiency.

According to a fifteenth aspect of the invention, there is provided the holographic projection device according to the fourteenth aspect, wherein said plurality of spatial light phase modulators are disposed on the same plane. As a result, adjustment can be easily made.

According to a sixteenth aspect of the invention, there is provided the holographic projection device according to the fifteenth aspect, wherein said plurality of spatial light phase modulators each are composed of a reflecting spatial light phase modulator. As a result, it is possible to realize a projection device in which high diffraction efficiency can be obtained by adopting a plurality of reflecting spatial light phase modulators and a bright projection video image can be obtained.

According to a seventeenth aspect of the invention, there is provided the holographic projection device according to the sixteenth aspect, wherein said plurality of spatial light phase modulators each include a mirror. As a result, it is possible to realize a projection device in which higher light utilization efficiency can be obtained and bright display can be achieved.

According to an eighteenth aspect of the invention, there is provided the holographic projection device according to the seventeenth aspect, wherein said plurality of light sources include at least a red light source, a green light source, and a blue light source, and said plurality of video image data include at least red data, green data, and blue data. As a result, it is possible to realize color display.

According to a nineteenth aspect of the invention, there is provided the holographic projection device according to the eighteenth aspect, wherein the data processing means handles the spatial frequency information as spatial phase information by subjecting the video image data to the Fourier transformation, after adding random phases to the video image data. As a result, it is possible to achieve display using phase diffraction having high diffraction efficiency. As a result, it is possible to realize a projection device in which light utilization efficiency is high and a bright projection video image can be obtained.

According to a twentieth aspect of the invention, there is provided the holographic projection device according to the nineteenth aspect, further comprising:

control means for controlling the amount of light that is irradiated by the red light source, the green light source, and the blue light source based on said plurality of video image data. As a result, it is possible to display a video image having excellent color balance.

According to a twenty-first aspect of the invention, there is provided the holographic projection device according to the thirteenth aspect, wherein the amount of light incident from the light sources is set to zero, while the spatial frequency information is altered in the information display means. As a result, unnecessary diffraction light can be prevented from being generated and a video image having high contrast can be provided.

According to a twenty-second aspect of the invention, there is provided the holographic projection device according to the thirteenth aspect, wherein the control means controls the amount of light by controlling the light sources. As a result, a light amount can be controlled without using a light intensity modulator and a video image having excellent color balance and excellent contrast can be easily provided.

According to a twenty-third aspect of the invention, there is provided the holographic projection device according to the twenty-second aspect, further comprising:

means for restricting illumination light from the light sources, such that the illumination light is not irradiated onto an area beyond an effective display range in the spatial light phase modulators. As a result, it is possible to prevent unnecessary stray light from being generated and to provide a video image having excellent contrast.

According to a twenty-fourth aspect of the invention, there is provided the holographic projection device according to the thirteenth or twenty-third aspect, further comprising:

means for trapping zero-order light reflected on the spatial light phase modulators. As a result, unnecessary stray light can be prevented from overlapping a video image, and a high-definition video image can be provided.

According to a twenty-fifth aspect of the invention, there is provided the holographic projection device according to the thirteenth or twenty-third aspect, further comprising:

zero-order light traps, each of which has an optical sensor function capable of measuring intensity of light and traps zero-order light reflected on the spatial light phase modulators, wherein the control means controls the amount of light that is irradiated by the light sources based on output information of the zero-order light traps. As a result, unnecessary stray light can be prevented from being generated, a video image having high contrast can be provided, and a high-definition video image having excellent color balance can be provided.

According to a twenty-sixth aspect of the invention, there is provided the holographic projection device according to the thirteenth or twenty-third aspect, further comprising:

zero-order light traps, each of which has an optical sensor function capable of measuring intensity of light, wherein the control means controls the amount of light, that is irradiated by the light sources, based on output information of the zero-order light traps and the video image data. As a result, unnecessary stray light can be prevented from being generated and a video image having high contrast can be provided. Moreover, brightness control can be realized in consideration of a change in diffraction efficiency due to a difference between video images in a spatial light phase modulator so that minute brightness control and color balance control can be realized and an impressive video image can be provided.

According to a twenty-seventh aspect of the invention, there is provided the holographic projection device according to the twenty-fifth or twenty-sixth aspect, wherein the control means controls the amount of light irradiated by the light sources based on a total light amount value of the amount of light in each scene of a video image by the video image data. As a result, it is possible to realize accurate brightness reproduction.

According to a twenty-eighth aspect of the invention, there is provided the holographic projection device according to the twenty-seventh aspect, wherein, when T is defined as the number of bits of a gradation, M and N are defined as the number of pixels of each information display means in vertical and horizontal directions respectively, and brightness of each pixel is defined as represented by the following Equation 1, the control means calculates the total light amount value using the following Equation 2:

$$B(x, y) = 2^T \quad \text{(Equation 1)}$$

$$H = \sum_{y=1}^{M} \sum_{x=1}^{N} B(x, y) \quad \text{(Equation 2)}$$

As a result, it is possible to accurately calculate the total light amount value.

According to a twenty-ninth aspect of the invention, there is provided the holographic projection device according to the twenty-eighth aspect, wherein, when H is defined as a total light amount value of a projected video image, S is defined as a light amount of zero-order light, and K is defined as a proportionality coefficient, the control means controls the amount of light irradiated by the light sources based on a value calculated using the following Equation 3:

$$F = \frac{H}{K} + S \qquad \text{(Equation 3)}$$

As a result, it is possible to achieve brightness control based on an accurate value.

According to a thirtieth aspect of the invention, there is provided the holographic projection device according to the thirteenth or twenty-ninth aspect, wherein a calculation precision of the data processing means is at least 12 bits or more. As a result, it is possible to represent a video image having a sufficient gradation.

According to a thirty-first aspect of the invention, there is provided the holographic projection device according to the thirteenth or thirtieth aspect, wherein the data processing means converts video image data into spatial frequency information after adding different random phases to the video image data in a subframe unit. As a result, it is possible to provide a clear video image that does not have speckle noise.

According to a thirty-second aspect of the invention, there is provided a holographic projection method comprising:

a Fourier transformation step of converting video image data into spatial phase information using Fourier transformation after adding different random phases to the video image data in a subframe unit;

an information provision step of providing the spatial phase information to information display means;

a display step of displaying spatial phase information corresponding to the video image data as a phase distribution on the information display means;

an irradiation step of irradiating light onto the information display means using light sources;

a light amount adjustment step of controlling drivers of the light sources to adjust the amount of light irradiated by the light sources based on the video image data; and a projection step of projecting diffraction light, which is irradiated by the light sources and modulated as the spatial phase information by the information display means, onto projection means. As a result, it is possible to provide a clear video image that does not have speckle noise.

BRIEF DESCRIPTION OF THE SEVERAL VIEWS OF THE DRAWING

FIG. 6A is a cross-sectional view illustrating a reflecting MMD in a holographic projection device according to an embodiment of the invention.

FIG. 6B is a cross-sectional view illustrating a reflecting MMD in a holographic projection device according to an embodiment of the invention.

DETAILED DESCRIPTION OF THE INVENTION

Hereinafter, one embodiment of the invention will be described with reference to the accompanying drawings.

Figure 1:
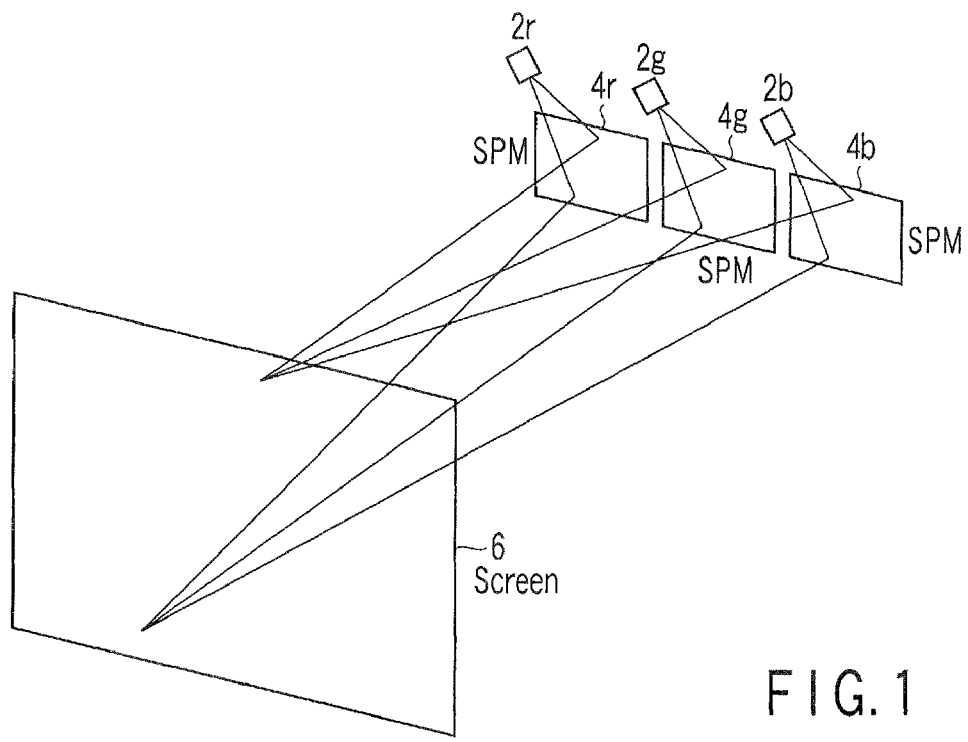
FIG. 1 is a block diagram illustrating an example of the configuration of a holographic projection device according to an embodiment of the invention.

FIG. 1 is a diagram illustrating an example of the configuration of a holographic projection device according to an embodiment of the invention. As shown in the drawing, the holographic projection device according to this embodiment includes a light source 2r for red that is composed of a laser diode (LD) and functions as a red light source, a light source 2g for green that is composed of an LD and functions as a green light source, and a light source 2b for blue that is composed of an LD and functions as a blue light source, and reflecting SPMs 4r, 4g, and 4b that correspond to the light sources for the individual colors.

In this case, light generated by the light source 2r for red, the light source 2g for green, and the light source 2b for blue is incident on the SPMs 4r, 4g, and 4b correspond to the individual light sources, and diffracted based on information written in the SPMs 4r, 4g, and 4b, to be projected onto a screen 6. In addition, on the screen 6, information projected by the light source 2r for red, the light source 2g for green, and the light source 2b for blue is synthesized and reproduced as a color video image.

That is, in this embodiment, the light emitted from the light source 2r for red, the light source 2g for green, and the light source 2b for blue is not synthesized by, for example, a color synthesis prism to project a color video image. Instead, combinations of the light source 2r for red, the light source 2g for green, and the light source 2b for blue and the SPMs 4r, 4g, and 4b are arranged on the same plane in parallel to each other, as shown in FIG. 1, thereby realizing color display.

In this embodiment, as described above, a holographic projection device, which can obtain a projection video image of color display by means of the very simple configuration, is realized.

Figure 2:
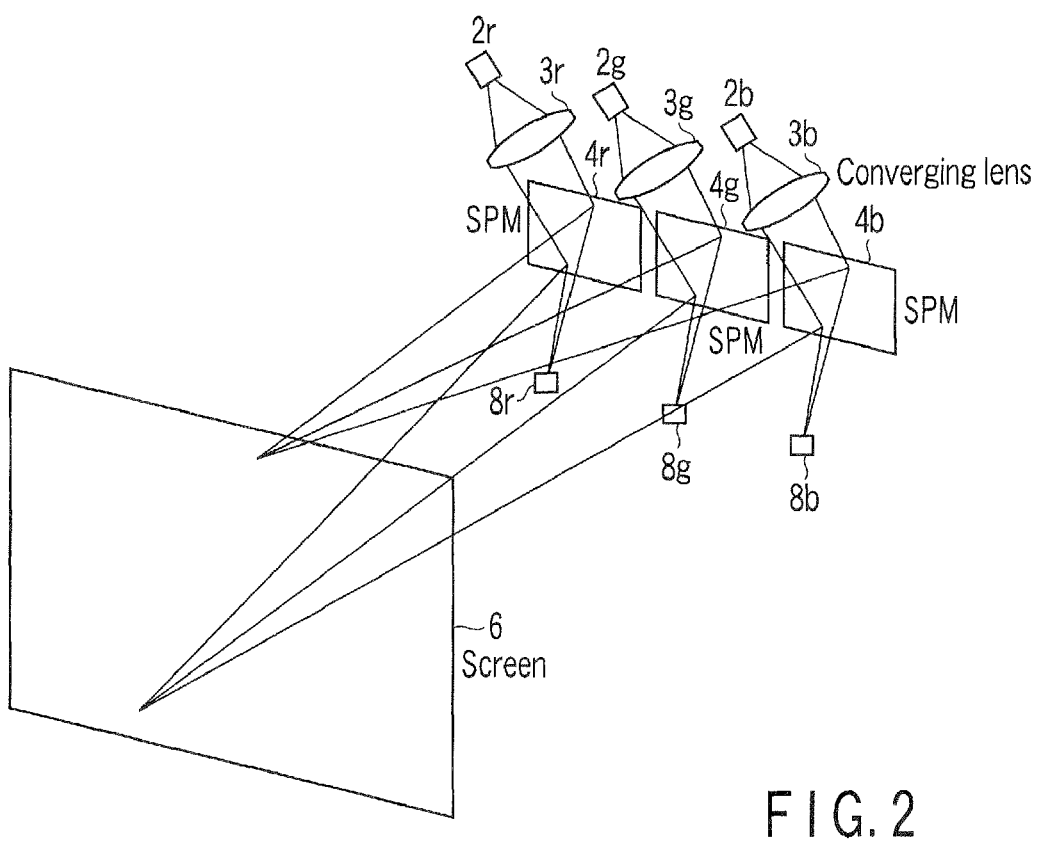
FIG. 2 is a block diagram illustrating an example of the configuration of a holographic projection device according to an embodiment of the invention.

In addition, illumination light is divergent light, and irradiated by the light source 2r for red, the light source 2g for green, and the light source 2b for blue from an oblique upper side of the SPMs 4r, 4g, and 4b, as shown in FIGS. 1 and 2.

In this embodiment, a reflecting SPM is used as each of the SPMs 4r, 4g, and 4b. Specifically, in the reflecting SPM, a micromirror spatial light phase modulator (magic mirror device [MMD]), which will be described in detail below, is used. In addition, the LCOS may be used as the SPMs 4r, 4g, and 4b.

In addition, the holographic projection device according to this embodiment can be realized using the configuration of the device shown in FIG. 2. Hereinafter, a difference from the device configuration shown in FIG. 1 will be mainly described.

That is, in the example of the device configuration shown in FIG. 2, the holographic projection device includes a light source 2r for red that is composed of an LD and functions as a red light source, a light source 2g for green that is composed of an LD and functions as a green light source, a light source 2b for blue that is composed of an LD and functions as a blue light source, converging lenses 3r, 3g, and 3b that converge light emitted from the light sources for the individual colors respectively, reflecting SPMs 4r, 4g, and 4b that correspond to the light sources for the individual colors, and zero-order light traps 8r, 8g, and 8b that capture zero-order light generated by the SPMs 4r, 4g, and 4b.

In this case, the light emitted from the light source 2r for red, the light source 2g for green, and the light source 2b for blue is incident on the SPMs 4r, 4g, and 4b corresponding to the individual light sources through the converging lenses 3r, 3g, and 3b corresponding to the individual light sources, diffracted based on information written in the SPMs 4r, 4g, and 4b, and projected onto the screen 6.

In addition, on the screen 6, the information projected by the light source 2r for red, the light source 2g for green, and the light source 2b for blue is synthesized, and reproduced as a color video image.

In addition, the zero-order light generated by the SPMs 4r, 4g, and 4b is captured by the zero-order light traps 8r, 8g, and 8b. As a result, unnecessary stray light can be prevented from being generated and a video image having excellent contrast can be projected.

Figure 3:
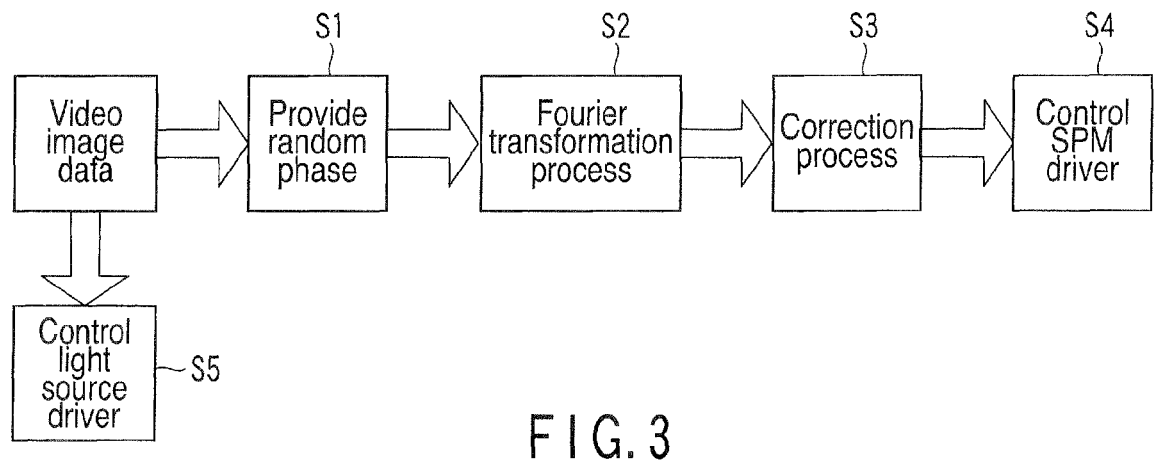
FIG. 3 is a diagram illustrating a sequence for converting video image data into information displayed on an MMD in a holographic projection device according to an embodiment of the invention.

Next, a sequence for converting video image data into the information displayed on the MMD in the SPMs 4r, 4g, and 4b will be described with reference to FIG. 3. The process in each step shown in FIG. 3 is executed by control means (not shown) that is included in the holographic projection device according to this embodiment.

In this embodiment, phase information obtained by Fourier transformation of video image data is displayed on the SPMs 4r, 4g, and 4b. Illumination light is irradiated onto the SPMs 4r, 4g, and 4b, and light diffracted by the SPMs 4r, 4g, and 4b is projected onto the screen 6.

In addition, it is preferable that the illumination light from the light source 2 be not irradiated beyond an effective display range of phase information in the SPMs 4r, 4g, and 4b.

First, video image data of a video image that is to be projected is obtained. In this case, the video image data is subjected to Fourier transformation to be converted into spatial frequency distribution information. However, when the video image data is subjected to Fourier transformation as it is, a spatial phase distribution and a spatial intensity distribution may be generated. For this reason, it is not possible to diffract light by a phase modulation with excellent diffraction efficiency.

In view of such circumstances, before subjecting video image data to Fourier transformation, random phase information is added to the video image data in advance (random phase provision step S1). Then, after adding the random phase information to the video image data, the video image data is subjected to Fourier transformation (Fourier transformation step S2).

If the random phase information is added to the video image data, it means that a phase value different for each pixel is added to intensity information of each pixel of one frame of the video image data. For example, it means that a value of 128+j is obtained, when a value of the intensity of an arbitrary pixel is 128. In this case, j is a unit imaginary number.

The human eye (and image sensors) can sense only the intensity of light. Accordingly, a phase represented in an imaginary unit does not have a practical meaning, but has an important meaning for calculation. That is, a phase is included even in pure intensity information after subjecting video image data to Fourier transformation.

If random phases are added to the video image data in advance, values of intensity portion after Fourier transformation can be averaged over the entire spatial frequency surface, and the intensity can be equalized over the entire frequency surface. That is, it is possible to obtain pure phase information having no change in intensity.

In the case where the video image data is subjected to Fourier transformation, after taking the root of a value of the signal intensity of the video image data, that is, converting the video image data into amplitude information, Fourier transformation is preferably performed. In addition, the random phase is preferably added to the amplitude information.

In this way, the video image data can be converted into phase information. In other words, the spatial frequency information can be converted into phase information, that is, spatial phase information. Since this method is a technology that is conventionally known as a kinoform, the detailed description thereof will be omitted herein. If a random phase is made to overlap video image data, the intensity on the spatial frequency distribution can be averaged and the video image data can be satisfied by only phase information.

The holography technology that also includes the kinoform is disclosed in detail in, for example, W. H. Lee: "Computer-generated holograms: techniques and applications," in Progress in Optics, E. Wolf, ed., (North-Holland, Amsterdam, 1978), Vol. 16, pp. 119-232.

As described above, the video image data where the random phase overlaps and Fourier transformation is performed is converted into spatial phase information that is composed of only phase information. Then, a correction process (correction process step S3) based on optical arrangement is executed on the spatial phase information and the corrected spatial phase information is input to an SPM driver. In this case, the SPM driver is a driver that generates a driving signal to drive the SPMs 4r, 4g, and 4b.

When the video image data has a gradation of A bits, the transform calculation is preferably made based on the number of bits that maintains the gradation. That is, in this case, it is preferable that effective digits of a Fourier transformation result be A bits or more. Accordingly, even in the mid-calculation, a precision where effective digits are A bits or more is minimally needed.

In the related art, the gradation of the digital video image is 8 bits, and the calculation is also made based on the corresponding number of bits. In recent years, however, a gradation of 12 bits or more is required. Accordingly, a calculation precision of 12 bits or more, including digital data of an original video image, is needed.

In this case, as shown in FIGS. 1 and 2, the illumination light is convergent light and irradiated from the oblique upper side of the SPMs 4r, 4g, and 4b. In addition, spatial phase information for projecting a video image in spreading on a front side with respect to said illumination light is provided to the SPMs 4r, 4g, and 4b.

That is, after providing a phase (Step S1) when the video image data is subjected to Fourier transformation, spatial phase information that depends on the corresponding optical system is provided to the SPMs 4r, 4g, and 4b, such that the video image is projected in a desired direction. The projection (holographic projection) method that uses diffraction in this embodiment is different from a method that controls brightness of each pixel to form an image. That is, in the projection method, brightness of each pixel is displayed on a screen by diffraction of light on the front side of the SPMs 4r, 4g, and 4b.

In addition, a driving signal is applied to the SPMs 4r, 4g, and 4b by the SPM driver, such that spatial phase information which corresponds to a video image to be projected onto the SPMs 4r, 4g, and 4b, appears as a phase distribution (SPM driver control step S4).

Meanwhile, when the diffraction efficiency of the SPMs 4r, 4g, and 4b is constant, both a video image of a dark scene and a video image of a bright scene may become a video image that has the same brightness. Accordingly, in accordance with the total amount of the light amounts of the video images, the amount of light that is incident on the SPMs 4r, 4g, and 4b needs to be changed as follows.

That is, the total amount (the total light amount value; a calculation method thereof will be described in detail below) of brightness of each scene in the projected video image is calculated, and the amount of light to be incident on the SPMs 4r, 4g, and 4b is controlled such that the brightness of each scene becomes appropriate (light source driver control step S5). In Step S5, the drivers of the light source 2r for red, the light source 2g for green, and the light source 2b for blue are controlled based on the video image data.

In addition, in the case of the configuration of the device that is shown in FIG. 2, the amount of light by the light source 2r for red, the light source 2g for green, and the light source 2b for blue may be controlled based on output information of the zero-order light traps 8r, 8g, and 8b. The zero-order light traps 8r, 8g, and 8b each may be composed of an optical sensor, and the amount of light by the light source 2r for red, the light source 2g for green, and the light source 2b for blue may be controlled based on the output information of the zero-order light trap and the video image data.

Figure 4:
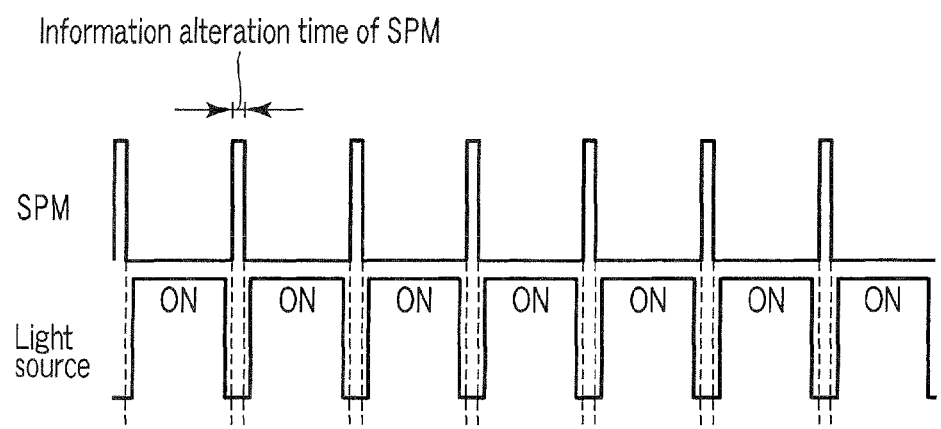
FIG. 4 is a diagram illustrating a timing chart that represents a relationship between an operation of an SPM and light-emitting operations of laser diodes for red, green, and blue by the same time base t, when color display is performed on a projection video image by performing light source control, in a holographic projection device according to an embodiment of the invention.

FIG. 4 shows an aspect of light source control in a holographic projection device according to this embodiment. FIG. 4 is a diagram illustrating a timing chart that represents a relationship between operations of SPMs 4r, 4g, and 4b and light-emitting operations of light sources 2r, 2g, and 2b for red, green, and blue by the same time base t.

In this case, in a holographic projection device according to this embodiment, as shown in FIG. 1, a plurality of light sources and the SPMs correspond to each other. In addition, the holographic projection device simultaneously makes the light source 2r for red, the light source 2g for green, and the light source 2b for blue emit light, thereby performing color display. While the SPMs 4r, 4g, and 4b alter individual color information, as shown in FIG. 4, all of the light sources, that is, the light source 2r for red, the light source 2g for green, and the light source 2b for blue are turned off. Instead of turning off the light sources so as not to emit light, a light shielding unit may be installed so as not to make light from the light sources be incident.

In regards to the light amount control, light emission intensity of the light source 2r for red, the light source 2g for green, and the light source 2b for blue is adjusted based on video image data, as described above. In addition, a light intensity modulator may be installed in the middle of an optical path of light that is irradiated by the light source 2r for red, the light source 2g for green, and the light source 2b for blue.

Meanwhile, when the ideal diffraction efficiency of the SPMs 4r, 4g, and 4b is 100%, the amount F of light that is represented by a sum of amounts of light incident on the individual SPMs 4r, 4g, and 4b is proportional to the total light amount value H of one scene in the projection video image. This is applicable to the case where diffraction efficiency of the SPMs is constant. Here, if brightness of a pixel of a gradation T-bit at address (x, y) is defined as B(x,y), the following Equation 7 is obtained.

$$B(x,y) \leq 2^T \quad \text{(Equation 7)}$$

From Equation 7, the following Equation 8 is obtained and the total light amount value H of one scene can be calculated.

$$H = \sum_{y=1}^{M} \sum_{x=1}^{N} B(x, y) \quad \text{(Equation 8)}$$

In this case, M and N denote the number of pixels vertically and the number of pixels horizontally, respectively. For example, in the case of a high-definition TV, the conditions M=1080 and N=1920 are applied. If the brightness of the light source is controlled based on the total light amount value H, appropriate brightness in each scene of video images is obtained. As a result, considerably clear video images can be reproduced to be dark in a dark scene of a video image and bright in a bright scene of a video image.

In addition, diffraction efficiency may be changed depending on a video image. In this case, in order to accurately perform a correction process, the amount S of zero-order light may be measured, and brightness of the light source may be controlled such that a value obtained by subtracting the amount S of light from the amount F of incident light represented by a sum of amounts of light incident on the SPMs 4r, 4g, and 4b is proportional to the total light amount value H. That is, if a proportionality coefficient is defined as K, the following Equation 9 is obtained.

$$K(F-S) = H \quad \text{(Equation 9)}$$

That is, the brightness of the light source may be controlled such that the amount of incident light becomes the amount of incident light represented by the following Equation 10.

$$F = \frac{H}{K} + S \quad \text{(Equation 10)}$$

Hereinafter, a method of reducing noise in a holographic projection method and a holographic projection device according to this embodiment will be described. In WO 2005/059881A3, the reduction of noise is described as follows.

That is, according to the contents that are disclosed in WO 2005/059881A3, examples of noise include systematic noise and non-systematic noise.

Further, according to the contents, systematic noise include noise due to an error that occurs at the time of reproducing a phase by the SPM and noise due to irregularity, and non-systematic noise include noise due to an error that occurs at the time of executing an algorithm and noise due to a binarization error.

In addition, as means for dealing with non-systematic noise, there is suggested a technology using a subframe as a technology that repeats one frame plural times as follows.

That is, for example, if time of one frame is 1/60 second, the corresponding time is divided into 1/180 second and the same video image is displayed three times. In this way, a method in which noise is averaged and reduced is disclosed in WO 2005/059881A3. In addition, according to the contents disclosed in WO 2005/059881A3, since noise occurs by a device, a process of adding a random phase to video image data does not need to be repeated.

However, if the above-described various types of noise are reduced, speckle noise become highly visible. Speckle noise conspicuously occurs when a laser is used, in particular. That is in a video image projected onto a screen where light from pixels around each pixel interferes with light from each pixel, speckle noise occurs when granular noise having high contrast is generated on the retina of a person who views the corresponding video image.

This speckle noise is generated when coherence exists in the light source used in projection. Accordingly, in speckle noise, if a wave surface is the same, the same speckle is reproduced. In the case of a video image where a projected video image gradually changes or a still picture, speckle noise is conspicuously observed. For this reason, in the case of the video image where the projected video image gradually changes or the still picture, it is necessary to change a phase of projection light without changing the projected video image.

In view of such circumstances, in this embodiment, one frame is divided into subframes (for example, one frame corresponding to 1/60 second is divided into subframes corresponding to 1/120 second), and even in each subframe, a random phase different from that of another subframe as a random phase added to video image data is added to the corresponding subframe. By this process, a shape of the generated speckle is changed and averaged, thereby reducing noise and displaying a high-definition video image. That is, one frame is divided into subframes, and different random phase data is added to the same video image data and the corresponding subframe is repeated.

Meanwhile, like the holographic projection device according to this embodiment, in a holographic projection device that includes the three light sources and the SPMs corresponding to the three light sources, for example, the device configuration shown in FIG. 5 can be adopted.

Figure 5A:
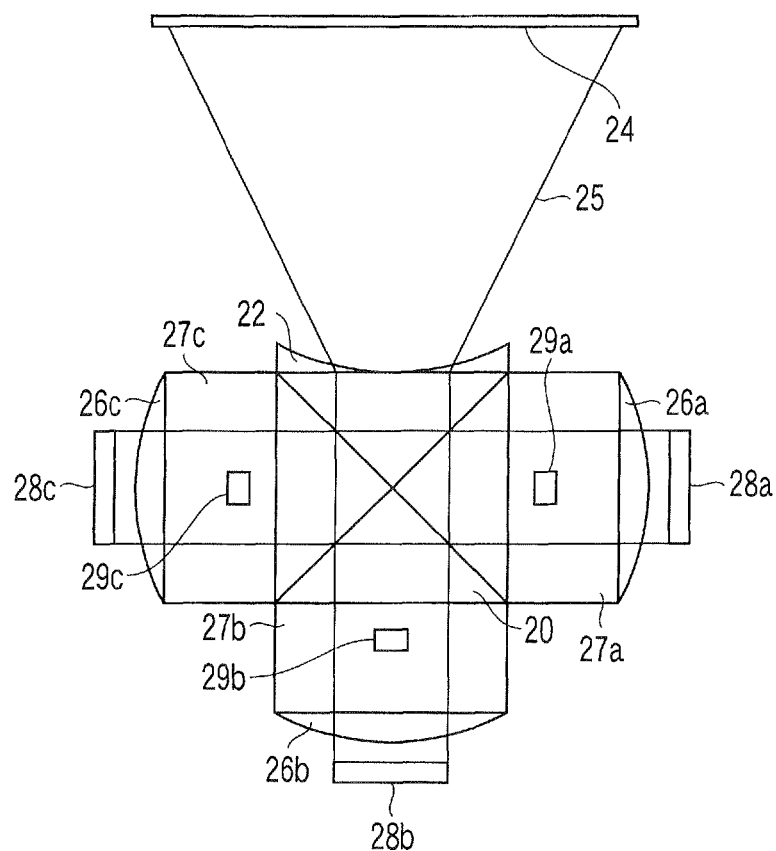
FIG. 5A is a diagram illustrating the configuration of a holographic projection device according to an embodiment of the invention disposed at a normal location, when viewed from an upper side.
Figure 5B:
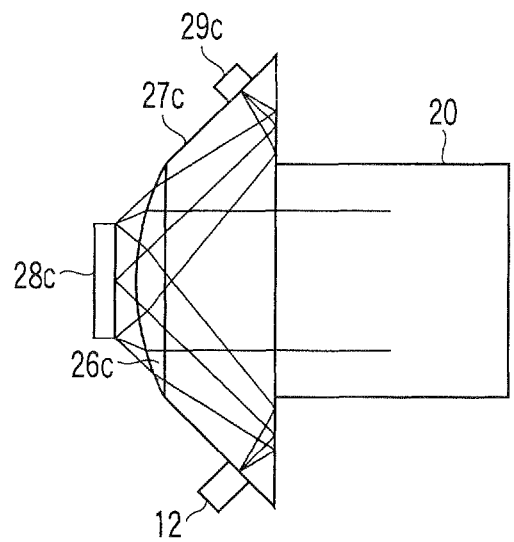
FIG. 5B is a diagram illustrating the configuration of a holographic projection device according to an embodiment of the invention disposed at a normal location, when a peripheral portion of an SPM for blue in the holographic projection device is viewed from a viewing direction E shown in FIG. 5A.
Figure 7:
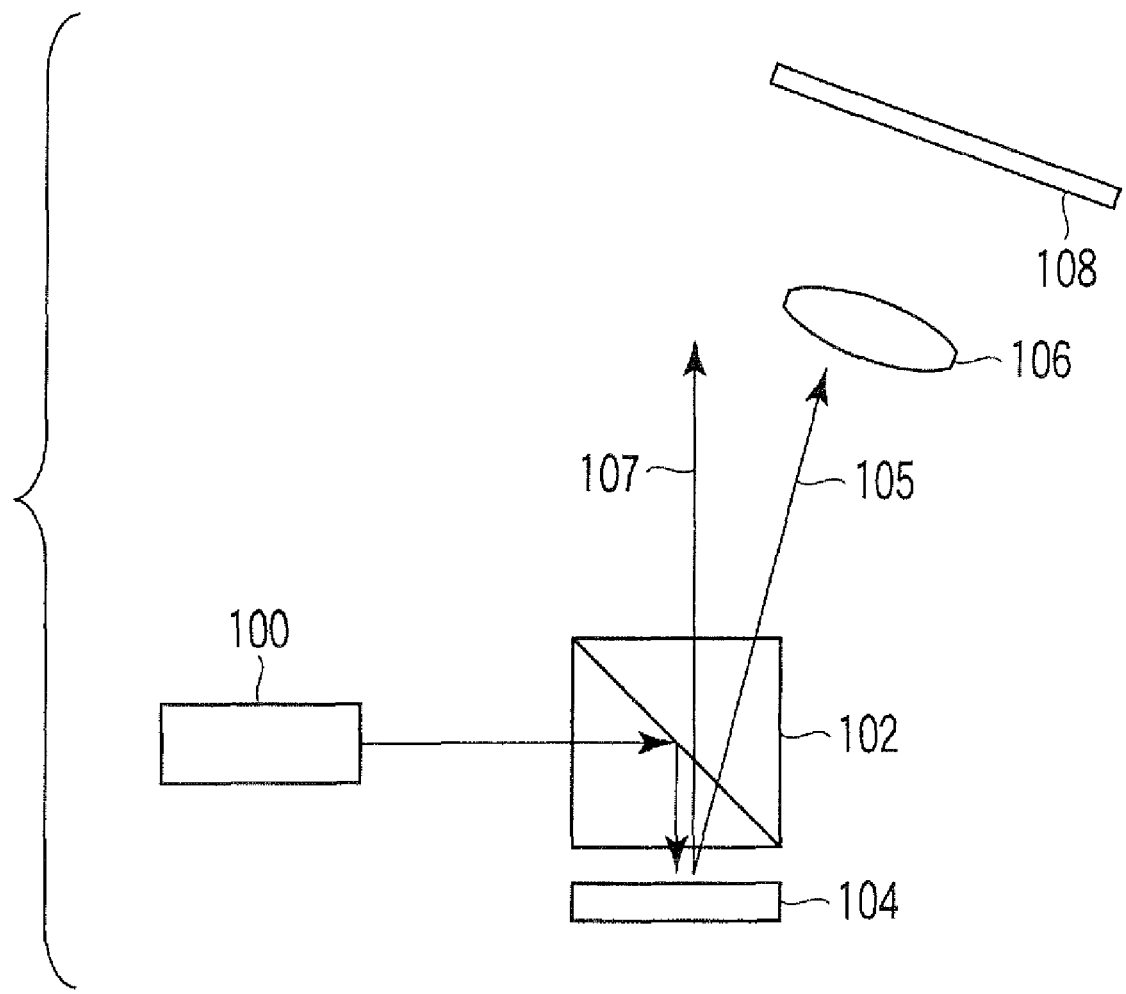
FIG. 7 is a diagram illustrating the configuration of a projector that uses a conventionally suggested SPM.

FIG. 5A is a diagram illustrating the configuration of a holographic projection device (disposed at a normal location) according to an embodiment of the invention that includes three light sources and SPMs corresponding to the three light sources, when viewed from an upper side. FIG. 5B is a diagram illustrating the configuration of a holographic projection device (disposed at a normal location) according to an embodiment of the invention that includes three light sources and SPMs corresponding to the three light sources, when a peripheral portion of an SPM for blue in the holographic projection device is viewed from a viewing direction E shown in FIG. 5A.

The holographic projection device shown in FIGS. 5A and 5B includes an LD for red (not shown in FIGS. 5A and 5B) that functions as a red light source, an LD 12 for green (not shown in FIGS. 5A and 5B) that functions as a green light source, an LD for blue (not shown in FIG. 5A) that functions as a blue light source, collimators 26a, 26b, and 26c that correspond to the light sources for the individual colors, respectively, total reflection prisms 27a, 27b, and 27c that correspond to the light sources for the individual colors, respectively, reflecting SPMs 28a, 28b, and 28c that correspond to the light sources for the individual colors, respectively, traps 29a, 29b, and 29c functioning as light shielding members that correspond to the light sources for the individual colors, respectively, a color synthesis prism 20 that synthesizes diffraction light of the individual colors, and a projection lens 22.

In this case, in regards to the zero-order light, as shown in FIG. 5B, light emitted from the LD 12 for blue is reflected on the total reflection prism 27c, collimated by the collimator 26c, and incident on the SPM 28c for blue. In this case, zero-order light passes through the collimator 26c again, is reflected on the total reflection prism 27c, and reaches the trap 29c. In this way, the unnecessary zero-order light is removed.

Meanwhile, among light irradiated by the LD 12 for blue, the light diffracted by a spatial phase modulation for a blue video image displayed on the SPM 28c for blue becomes an approximately collimated light beam by the collimator, and is then incident on the color synthesis prism 20. The light beam incident on the color synthesis prism 20 is reflected on a reflection surface of the color synthesis prism 20. After the reflection, the diffraction light 25 is projected onto the screen 24 through the projection lens 22.

In addition, as shown in FIG. 5A, in respect to light emitted from each of the LD for red and the LD for green, the same optical system as the optical system with respect to the light emitted from the above-described LD for blue is provided, and diffraction light that is related to red, green, and blue is synthesized by the color synthesis prism 20. As a result, a full-color video image is projected onto the screen.

In addition, as shown in FIG. 5A, the projection lens is composed of a concave lens (negative power), but may be composed of a convex lens (positive power). In addition, according to the above-described method, unlike the color sequence method, a color break phenomenon does not need to be considered.

In the SPMs 28a, 28b, and 28c, the LC and the LCOS may be used. However, since the LC cannot increase an opening ratio, the LC has bad light utilization efficiency. In addition, since the LCOS has low reflectance, it is difficult to improve diffraction efficiency. However, it is possible to overcome the above disadvantages by using an MMD, which will be described in detail below.

In addition, with respect to the process of the video image data or the like that has been described with reference to FIG. 3 and the on/off control on the light sources when altering the information of the SPM that has been described with reference to FIG. 4, the same process and control are performed.

As described above, even when the configuration shown in FIGS. 5A and 5B is used, it is possible to provide a holographic projection method and a holographic projection device that can realize both video image display having appropriate brightness and energy saving. According to the configuration shown in FIGS. 1 and 2, the configuration of the device can be simplified.

FIGS. 6A and 6B are cross-sectional views illustrating a reflecting MMD that constitutes the SPMs 4a, 4b, and 4c in a holographic projection device according to this embodiment. In the drawings, cross-sectional views of a portion corresponding to three pixels are shown, but actually, a plurality of pixels exist two-dimensionally. Hereinafter, the structure of the MMD will be described with reference to FIGS. 6A and 6B.

That is, in this embodiment, an MMD 36 has a substrate 38, an insulating layer 40, springs 42, electrodes 44, columns 46, a thin film 48, and a mirror 50.

Specifically, the insulating layer 40 is provided on the substrate 38 including a switch circuit that drives each pixel to modulate a phase. Further, the springs 42 are provided on the insulating layer 40. In addition, the electrode 44 that is connected to the switch circuit is provided in a concave portion of the insulating layer 40 under each spring 42.

In this case, in the MMD 36, as shown in FIG. 6B, the mirror 50 can be deformed. That is, in the MMD 36, the spring 42 corresponds to each pixel for a phase modulation, and the thin film 48 is provided above the springs 42 in a state where the columns 46 provided on the springs 42 are interposed between the springs 42 and the thin film 48. In addition, the mirror 50 is integrally provided on the thin film 48.

As such, in this embodiment, the mirror 50 does not adopt the structure where the mirror is divided to correspond to each spring 42, but adopts a piece of board-shaped structure. By this structure, the shape change of the mirror 50 is continuously and gradually generated. That is, an unnecessary diffraction order can be suppressed from being generated and diffraction efficiency can be improved.

In addition, the thin film 48 is formed of a material having excellent flexibility and durability. The mirror 50 is formed of a dielectric multilayer or a metal having high reflectance.

In this case, if a voltage is applied to the electrode 44, the spring 42 becomes close to the substrate 38 by means of a Coulomb force that is generated between the mirror 50 and the electrode 44, and the surface of the mirror 50 is indented. The amount by which the phase of the light reflected on the mirror 50 changes because of the indentation is ¼ of a wavelength. That is, in this way, it is possible to generate a phase difference of a half-wavelength on a reciprocal path, that is, $\pi$.

In addition, the above operation is a binary operation that only inverts a phase. However, if a spring constant of the spring 42 is appropriately selected, it is possible to control a strain of the spring 42 by the voltage, that is, the indentation of the mirror 50. In this case, if the mirror 50 is controlled to have an indentation that corresponds to half the maximum wavelength, it is possible to generate a phase difference that corresponds to a maximum of one wavelength on a reciprocal path. In addition, it is possible to obtain diffraction efficiency higher than that in the binary modulation.

In addition, for example, Si is used in the substrate 38, $SiO_2$ or SiC is used in the insulating layer 40, and a flexible metal or conductive organic film is used in the spring 42. In addition, a conductive material may be coated on the conductive organic film. In addition, in the electrode 44, for example, Al, Cu, or W is used. In the thin film 48, for example, a flexible organic film or $Si_2N_3$ is used.

As such, it is possible to provide the SPMs 4r, 4g, and 4b having excellent efficiency that can reflect almost 100% of the incident light to use the mirror 50.

In addition, in regards to the binary control and the structure of the spring 42, the technologies that are disclosed in U.S. Pat. No. 5,835,255 and U.S. Pat. No. 6,040,937 may be referred to. In these documents, a technology that is related to an element that performs color display using a Fabry-Perot etalon principle is disclosed.

As described above, according to the embodiment of the invention, it is possible to provide a holographic projection device and a holographic projection method that can realize both video image display having appropriate brightness and energy saving with the simple configuration and reduce speckle noise.

The present invention has been described based on the embodiment. However, the present invention is not limited to the above-described embodiment, and various changes and modifications can be made without departing from the spirit and scope of the present invention.

For example, the colors of the light sources may be a combination of three primary colors of complementary colors as long as the corresponding colors are three primary colors that can constitute a color video image, and is not limited to a combination of red, green, and blue.

Further, in the above-described embodiments, the invention of various steps is included, and various inventions can be extracted from proper combinations of the plurality of disclosed constituent elements. For example, even if some of the constituent elements described in the above-described embodiments are removed, when the problems described in the problem to be solved by the invention can be solved and the effects described in the effect of the invention can be achieved, the configuration where some constituent elements are removed can be extracted as the invention.

What is claimed is:

1. A holographic projection method comprising:
   converting a plurality of video image data into individual spatial frequency information using Fourier transformation;
   providing the individual spatial frequency information to a plurality of information display units respectively corresponding to the individual spatial frequency information;
   displaying the spatial frequency information respectively corresponding to the plurality of video image data on the plurality of information display units;
   irradiating light onto the plurality of information display units using a plurality of light sources respectively corresponding to the plurality of information display units, wherein an amount of light that is irradiated by the plurality of light sources is adjusted based on the plurality of video image data; and
   projecting the spatial frequency information respectively displayed by the plurality of information display units using diffraction light and synthesizing a plurality of video images onto a projection surface.

2. The holographic projection method according to claim 1, wherein the plurality of light sources include a red light source, a green light source, and a blue light source, and the plurality of video image data include red video image data, green video image data, and blue video image data.

3. The holographic projection method according to claim 1, wherein each of the plurality of information display units comprises a spatial light phase modulator.

4. The holographic projection method according to claim 3, wherein the plurality of spatial light phase modulators are disposed on a same plane.

5. The holographic projection method according to claim 4, wherein each of the plurality of spatial light phase modulators is a reflecting spatial light phase modulator.

6. The holographic projection method according to claim 3, wherein each of the plurality of spatial light phase modulators includes a mirror.

7. The holographic projection method according to claim 2, wherein while the spatial frequency information is altered in a given information display unit, an amount of light that is incident from a corresponding one of the red light source, the green light source, and the blue light source is set to zero.

8. The holographic projection method according to claim 7, wherein the adjustment of the light amount irradiated by the plurality of light sources is performed by controlling the red light source, the green light source, and the blue light source.

9. The holographic projection method according to claim 1, wherein the plurality of video image data are converted into the individual spatial frequency information using Fourier transformation after a random phase is added to the plurality of video image data.

10. The holographic projection method according to claim 9, wherein a correction process based on phase information depending on an optical system is executed on the individual spatial frequency information, after the individual spatial frequency information including spatial light phase information is obtained by performing the Fourier transformation.

11. The holographic projection method according to claim 10, wherein each of the plurality of information display units comprises a spatial light phase modulator, and
  wherein the correction process is executed based on a distance between a spatial light phase modulator and a projection unit.

12. A holographic projection device comprising:
a plurality of light sources which irradiate light;
a data processing unit which converts a plurality of video image data into individual spatial frequency information using Fourier transformation;
a control unit which controls an amount of light irradiated by the plurality of light sources based on the plurality of video image data; and
a plurality of information display units which are provided respectively corresponding to the plurality of light sources to display the corresponding spatial frequency information;
wherein the plurality of information display units are disposed such that diffraction light, which is irradiated by the plurality of light sources and modulated as the individual spatial frequency information by the plurality of information display units, is synthesized as a projection video image on a projection surface.

13. The holographic projection device according to claim 12, wherein each of the plurality of information display units comprises a spatial light phase modulator.

14. The holographic projection device according to claim 13, wherein the plurality of spatial light phase modulators are disposed on a same plane.

15. The holographic projection device according to claim 14, wherein each of the plurality of spatial light phase modulators is a reflecting spatial light phase modulator.

16. The holographic projection device according to claim 15, wherein each of the plurality of spatial light phase modulators includes a mirror.

17. The holographic projection device according to claim 16, wherein the plurality of light sources include at least a red light source, a green light source, and a blue light source, and the plurality of video image data include at least red image data, green image data, and blue image data.

18. The holographic projection device according to claim 12, wherein the data processing unit handles the spatial frequency information as spatial phase information by subjecting the plurality of video image data to the Fourier transformation, after adding random phases to the plurality of video image data.

19. The holographic projection device according to claim 12, wherein while the spatial frequency information is altered in a given information display unit, an amount of light that is incident from a corresponding one of the light sources is set to zero.

20. The holographic projection device according to claim 12, wherein the control unit controls the amount of light by controlling the light sources.

21. The holographic projection device according to claim 13, further comprising:
a unit for restricting illumination light from one of the light sources, such that the illumination light is not irradiated onto an area beyond an effective display range in a corresponding one of the spatial light phase modulators.

22. A holographic projection device comprising:
a plurality of light sources which irradiate light;
a data processing unit which converts a plurality of video image data into individual spatial frequency information using Fourier transformation;
a plurality of spatial light phase modulators which are provided respectively corresponding to the plurality of light sources to display the corresponding spatial frequency information; and
a unit which traps zero-order light reflected on the plurality of spatial light phase modulators;
wherein the plurality of spatial light phase modulators are disposed such that diffraction light, which is irradiated by the plurality of light sources and modulated as the individual spatial frequency information by the plurality of spatial light phase modulators, is synthesized as a projection video image on a projection surface.

23. A holographic projection device comprising:
a plurality of light sources which irradiate light;
a data processing unit which converts a plurality of video image data into individual spatial frequency information using Fourier transformation;
a control unit;
a plurality of spatial light phase modulators which are provided respectively corresponding to the plurality of light sources to display the corresponding spatial frequency information; and
a plurality of zero-order light traps, each of which includes an optical sensor that measures an intensity of light and traps zero-order light reflected on a corresponding one of the spatial light phase modulators;
wherein the plurality of spatial light phase modulators are disposed such that diffraction light, which is irradiated by the plurality of light sources and modulated as the individual spatial frequency information by the plurality of spatial light phase modulators, is synthesized as a projection video image on a projection surface; and
wherein the control unit controls an amount of light that is irradiated by the plurality of light sources based on output information of the plurality of zero-order light traps.

24. A holographic projection device comprising:
a plurality of light sources which irradiate light;
a data processing unit which converts a plurality of video image data into individual spatial frequency information using Fourier transformation;
a control unit;
a plurality of zero-order light traps, each of which includes an optical sensor which measures an intensity of light; and
a plurality of spatial light phase modulators which are provided respectively corresponding to the plurality of light sources to display the corresponding spatial frequency information;
wherein the plurality of spatial light phase modulators are disposed such that diffraction light, which is irradiated by the plurality of light sources and modulated as the individual spatial frequency information by the plurality of spatial light phase modulators, is synthesized as a projection video image on a projection surface; and
wherein the control unit controls an amount of light that is irradiated by the plurality of light sources based on output information of the plurality of zero-order light traps and the plurality of video image data.

25. The holographic projection device according to claim 23, wherein the control unit controls the amount of light irradiated by the plurality of light sources based on a total light amount value of an amount of light in each scene of a video image of the video image data.

26. The holographic projection device according to claim 25, wherein, when T is defined as a number of bits of a gradation, M and N are defined as a number of pixels vertically and a number of pixels horizontally in each spatial light phase modulator, respectively, and brightness of each pixel is defined as represented by the following Equation 1, the control unit calculates the total light amount value using the following Equation 2:

$$B(x, y) = 2^T \quad \text{(Equation 1)}$$

$$H = \sum_{y=1}^{M} \sum_{x=1}^{N} B(x, y). \quad \text{(Equation 2)}$$

27. The holographic projection device according to claim 26, wherein, when H is defined as the total light amount value of a projected video image, S is defined as a light amount of zero-order light, and K is defined as a proportionality coefficient, the control unit controls the amount of light irradiated by the light sources based on a value calculated using the following Equation 3:

$$F = \frac{H}{K} + S. \quad \text{(Equation 3)}$$

28. A holographic projection device comprising:
a plurality of light sources which irradiate light;
a data processing unit which converts a plurality of video image data into individual spatial frequency information using Fourier transformation; and
a plurality of information display units which are provided respectively corresponding to the plurality of light sources to display the corresponding spatial frequency information;
wherein the plurality of information display units are disposed such that diffraction light, which is irradiated by the plurality of light sources and modulated as the individual spatial frequency information by the plurality of information display units, is synthesized as a projection video image on a projection surface; and
wherein the data processing unit converts the plurality of video image data into the individual spatial frequency information after adding different random phases to the plurality of video image data in a subframe unit.

29. The holographic projection device according to claim 22, wherein the unit which traps the zero-order light comprises a plurality of shielding members respectively corresponding to the plurality of light sources.

* * * * *